INVENTORS
JOSEPH H. LEGGETT.
ROBERT M. MOYER.
ATTORNEY

Patented Oct. 20, 1953

2,656,137

UNITED STATES PATENT OFFICE 2,656,137

DYNAMIC ENGINE MOUNT

Joseph H. Leggett, Bloomfield, and Robert M. Moyer, Great Notch, N. J., assignors to Curtiss-Wright Corporation, a corporation of Delaware Application July 29, 1949, Serial No. 107,484

6 Claims. (Cl. 248—5)

This invention relates to resilient engine mounting means and is particularly directed to resilient engine mounting means in which a natural frequency of vibration of the engine on its supporting structure is in resonance with engine vibration exciting forces at an operating speed of the engine.

Patent No. 2,175,999 to E. S. Taylor discloses a resilient engine mounting arrangement which is in widespread use on aircraft engines. It has been found that in any practical embodiment of said engine mount at least one said resonant condition exists in the operating speed range of the engine, that is, in its operating speed range the engine has one natural frequency of vibration relative to its supporting structure equal to the frequency of vibration of engine vibration exciting forces. The engine mount usually is designed so that said resonant condition does not occur in the normal operating speed range of the engine. For example in an aircraft engine having an idle speed range of 500 to 1300 R. P. M. and a normal operating speed range of 1400 to 2500 R. P. M. this resonant condition occurs at an engine speed of approximately 1000 R. P. M. This resonant condition could be avoided by making the engine mount more elastic for example by using softer or more pliable rubber bushings, but then the static drop of the engine would become excessive. If the engine mount is provided with a damper for dampening said resonant vibrations then the damper will act to transmit engine vibrations to the engine supporting structure in the normal operating speed range of the engine. In accordance with the present invention, however, the mount is provided with a damper which is effective only in the engine speed range in which said resonance occurs.

Other objects of the invention will become apparent upon reading the annexed detailed description in connection with the drawing in which:

Figure 3 is an enlarged view of one of the resilient engine mount units;

Figure 4 is a side view of Figure 3;

Figure 5 is a sectional view taken along line 5—5 of Figure 3;

Figure 6 is a sectional view taken along line 6—6 of Figure 5; and

Figures 7 and 8 are views similar to Figure 3 but illustrating the damper device at different engine conditions.

Figure 1:
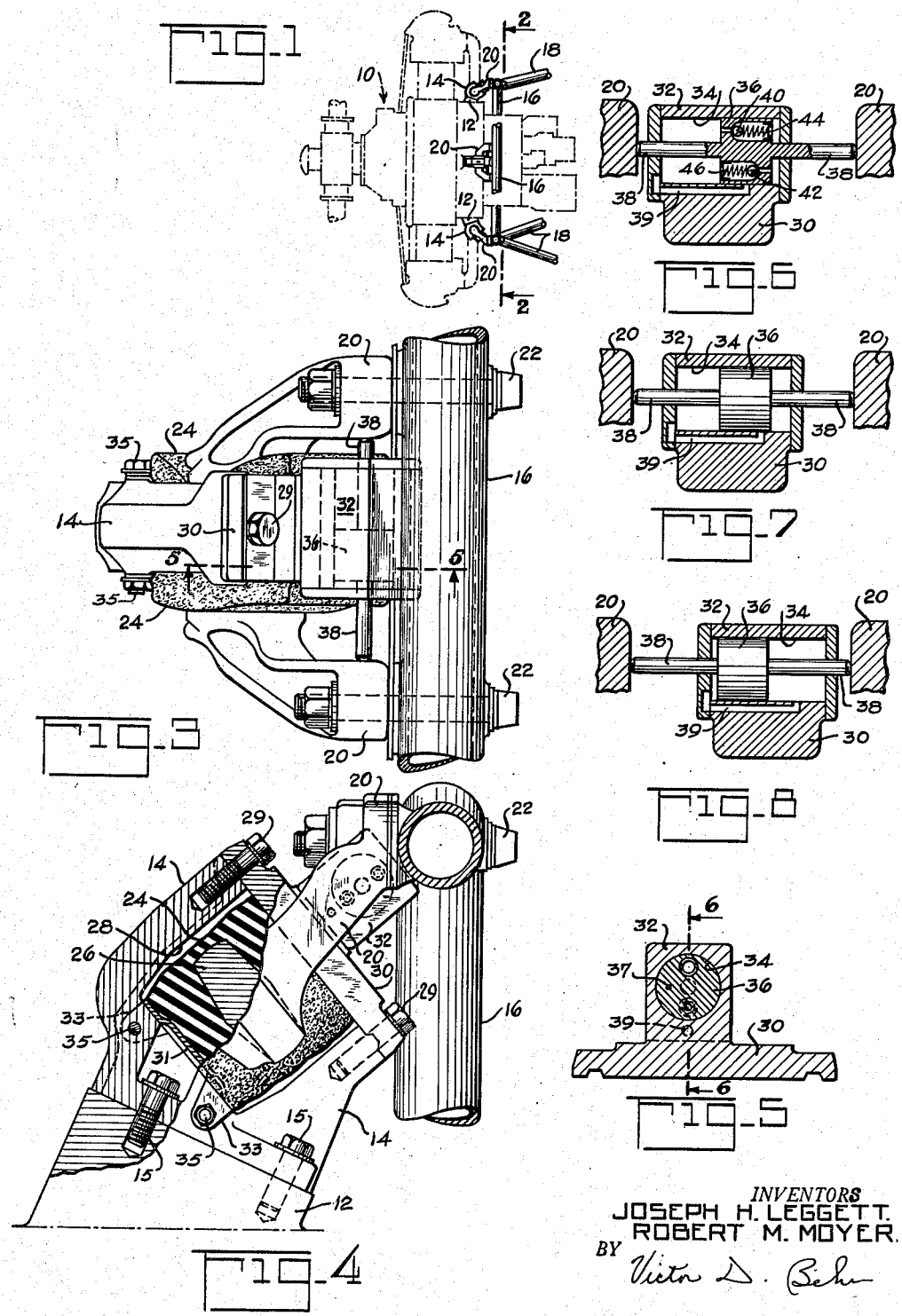
Figure 1 is a schematic view of an engine and mounting structure therefor embodying the invention.
Figure 2:
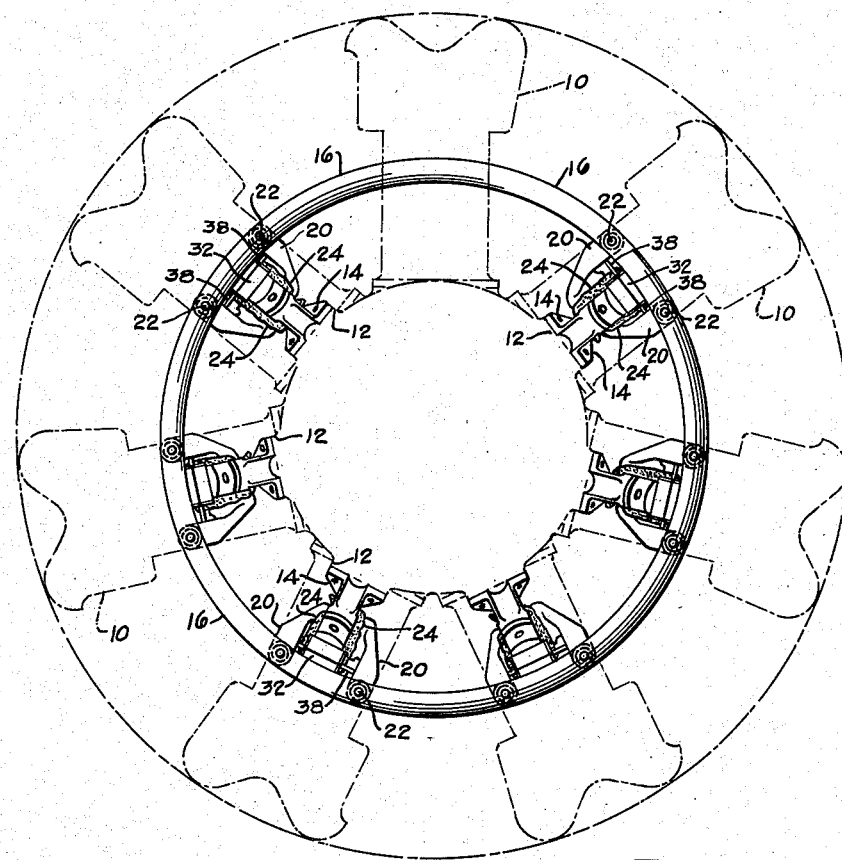
Figure 2 is an enlarged rear view of Figure 1.

The invention has been designed for use in connection with a resilient mounting means for an aircraft engine. As will appear, however, the invention can be used in connection with any resilient mounting means of any engine.

Referring to the drawing, a conventional radial cylinder aircraft power plant is schematically indicated at 10. The power plant is provided with a plurality of mounting bosses 12 to each of which a bracket 14 is secured by screws 15. An engine supporting structure comprising a ring 16 is connected to the body of the aircraft by struts 18. A plurality of U-shaped brackets 20 are secured to the ring 16 by bolts 22, there being one bracket 20 for each engine bracket 14. A rubber bushing 24 is bonded to each U-shaped bracket about the base or bridge portion 26 of said U-shaped bracket.

Each engine bracket 14 is formed with a recess 28 within which the rubber bushing 24 of the associated bracket 20 is received. A plate 30 is secured to the bracket 14 across the outer end of its recess 28 by screws 29, said plate being bonded to the rubber bushing 24 disposed in said recess. In addition, a plate 31 is fitted across the bottom of said recess 28, said plate being bonded to the associated rubber bushing 24 and being provided with ears 33 for securement to its bracket 14 by screws 35. With this construction the pairs of brackets 14 and 20 and rubber bushings 24 interconnecting each pair of said brackets provide a resilient means for mounting the engine on the ring supporting structure 16 whereby the rubber bushings 24 isolate the vibrations of the engine 10 from said supporting structure. This much of the resilient engine mount is conventional.

In any particular embodiment of such a resilient engine mount if the rubber bushings 24 are sufficiently rigid to support the engine 10 without excessive static drop, then, at some engine speed a natural frequency of vibration of the engine relative to its supporting structure will be in resonance with the forces exciting said engine vibrations. In the example previously given this resonance occurs at approximately 1000 R. P. M. of the engine, said engine having an idling speed range of 500 to 1300 R. P. M. and having a normal operating speed range of 1400 to 2500 R. P. M.

In order to dampen said resonant vibrations a housing 32 having a cylindrical bore 34, closed at both ends, is formed rigid with a plate 30 secured to an engine mount bracket 14. A piston 36 is slidable within the bore 34 and piston rods 38 extend in opposite directions from the piston 36 into engagement with the two arms of the associated U-shaped bracket 20. The clearance between the piston 36 and the side walls of its cylindrical bore 34 is made such as to provide restricted communication between the opposite ends of said bore and/or one or more restricted passages 37 (Figure 5) may extend through said piston. The bore 34 is filled with a fluid such as air, oil, prestone, silicone, etc. or any other liquid or gas having a suitable viscosity stability in the range of surrounding temperatures normally encountered by the engine 10. With this construction, the piston 36 is operatively connected to and between the arms of the U-shaped bracket 20 and its cylinder 34 is connected to the associated engine bracket 14 whereby said piston and cylinder constitutes a dash-pot type damper which is effective to suppress vibrations of the engine relative to the engine supporting ring structure 16. As illustrated one such piston-cylinder damper has been provided for each pair of mounting brackets 14 and 20. As will appear, however, it is not necessary that each pair of engine mounting brackets be provided with such a damper, for example it may be sufficient to provide only one such damper for the entire engine.

By suppressing engine vibrations, the piston-cylinder damper obviously will transmit engine vibrations to the engine supporting structure 16. Accordingly at engine speeds at which the engine vibrations are not in resonance with the vibration exciting forces, a vibration damper is objectionable in that it prevents the rubber bushings from performing their intended function, namely that of vibrationally isolating the engine from its supporting structure. In the normal operating speed range of the engine, the engine torque output is substantially greater than in the idling speed range of the engine and this increase in torque distorts the rubber bushings 24 so that the engine brackets 14 shift relative to their supporting brackets 20. Figure 6 illustrates the position of a damper housing 32 carried by an engine bracket 14 relative to the associated arms of the supporting bracket 20 when the engine torque output is low or substantially zero. In Figure 8 the engine is being operated in its normal operating speed range in which it has substantial output torque so that the engine supported damper housing 32 has shifted relative to its cylindrical bore 34 and its supporting bracket 20.

When the engine is not running, the damper housing 32 is displaced slightly farther to the left, from its position of Fig. 6, conventional abutting surfaces on each supporting bracket 20 and on each engine bracket 14 limiting movement in this direction.

This torque responsive displacement of the damper housing 32 and its cylindrical bore 34 relative to the associated supporting bracket 20 and its piston 36 is used to render the damper ineffective in the normal operating speed range of the engine. For this purpose, a passage 39 is arranged to provide unrestricted communication between the opposite sides of the piston 36 when said piston 36 is displaced relative to its cylindrical bore 34 by the engine torque output as illustrated in Figure 8. When, however, the engine torque output is relatively low, as during engine idling, the surface portion of the piston 36 functions as a valve to close one end of the passage 39, as illustrated in Figure 6, thereby rendering said passage ineffective. With this arrangement, the piston 36 and its cylinder 34 are effective to dampen engine vibrations when the engine is operating with low torque output as during engine idling. That is, during engine idling operation the piston-cylinder damper constitutes a dash-pot arrangement which suppresses engine vibrations thereby preventing the large engine vibrations which would otherwise occur at the idling speed in which the engine vibrations are in resonance with the vibration exciting forces. In the operating speed range of the engine the engine torque output is substantially greater so that the cylinder 32 is displaced relative to its piston 36 to the condition illustrated in Figure 8 whereupon the passage 39 provides unrestricted communication between the two ends of said piston. Accordingly, in the operating speed range of the engine, the piston-cylinder damper is automatically rendered ineffective as a damper by the passage 39 so that the rubber bushings 24 are effective to isolate the vibrations of the engine from its supporting structure.

At this point it should be noted that the magnitude of the clearance between the piston 36 and its bore 34 and/or the magnitude of the restricted passage 37 as well as the size of the passage 39 obviously depend on the viscosity of the fluid in the cylindrical bore 34.

After a substantial amount of service, the rubber bushings 24 become permanently distorted, that is they take a permanent set, whereupon in the idling speed range of the engine the piston 36 and its cylindrical bore 34 will have the relative positions illustrated in Figure 7 instead of their initial relative positions illustrated in Figure 6. However, the piston 36 is made sufficiently wide so that it closes one end of the passage 39 in the idling speed range of the engine even after the bushings 24 have taken their maximum permanent set during their life.

With the damper so far described, any large and sudden change in the engine torque output, may cause excessively high pressures within the cylindrical bore 34. To prevent this a pair of pressure relief valves 40 and 42 are carried by the piston 36, each of the valves 40 and 42 being urged against their seats by springs 44 and 46 respectively. With this pressure relief valve arrangement, if there is a sudden and large increase in the engine torque output the fluid pressure to the left (Figure 6) of the piston 36 will increase until it exceeds the value at which the valve 40 opens against its spring 44, whereupon said pressure is relieved to the right side of said piston. Similarly the valve 42 is effective to relieve excessive fluid pressures on the right side of the piston 36 to the left side of said piston.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In combination with means for mounting an engine on a supporting structure in which said mounting means comprises a bracket for attachment to an engine, a bracket for attachment to a supporting structure and resilient means operatively connecting said brackets whereby said brackets shift relative to each other in response to and to an extent dependent on engine torque output; fluid pressure means for damping vibrations of said brackets relative to each other, said fluid pressure means including a pair of members operatively connected to said brackets for movement relative to each other in response to said bracket shift; first and second means for varying the vibration damping effectiveness of said vibration damping means, said first means being connected to one of said members and said second means being connected to the other of said members and being cooperable with said first means for rendering said vibration damping means substantially ineffective during a predetermined range of said bracket shift.

2. In combination with means for mounting an engine on a supporting structure in which said mounting means comprises a bracket for attachment to an engine, a bracket for attachment to a supporting structure and resilient means operatively connecting said brackets whereby said brackets shift relative to each other in response to and to an extent dependent on engine torque output; a dash-pot device for damping vibrations of said brackets relative to each other, said device including a pair of members operatively connected to said brackets for movement relative to each other in response to said bracket shift; first and second means for varying the vibration damping effectiveness of said dash-pot vibration damping device, said first means being connected to one of said members and said second means being connected to the other of said members and being cooperable with said first means for rendering said dash-pot vibration damping device substantially ineffective during a predetermined range of said bracket shift.

3. In combination with means for mounting an engine on a supporting structure in which said mounting means comprises a bracket for attachment to an engine, a bracket for attachment to a supporting structure and resilient means operatively connecting said brackets whereby said brackets shift relative to each other in response to and to an extent dependent on engine torque output; a piston; a cylinder within which said piston is slidable, said piston and cylinder being operatively connected to said brackets for movement relative to each other in response to said bracket shift; a restricted flow passage connected between the ends of said cylinder whereby said piston and cylinder constitute a dash-pot device adapted to damp vibrations of said brackets relative to each other; first means and second means for varying the vibration damping effectiveness of said dash-pot device, said first means being connected to said cylinder and said second means being connected to said piston and being cooperable with said first means for rendering said dash-pot device substantially ineffective when said bracket shift exceeds a predetermined value.

4. In combination with means for mounting an engine on a supporting structure in which said mounting means comprises a bracket for attachment to an engine, a bracket for attachment to a supporting structure and resilient means operatively connecting said brackets whereby said brackets shift relative to each other in response to and to an extent dependent on engine torque output; a piston; a cylinder within which said piston is slidable, said piston and cylinder being operatively connected to said brackets for movement relative to each other in response to said bracket shift; a restricted flow passage connected between the ends of said cylinder whereby said piston and cylinder constitute a dash-pot device adapted to damp vibrations of said brackets relative to each other; means connected to said cylinder and providing a passageway connectible in relatively unrestricted communication with opposite sides of said piston; and means connected to said piston and cooperable with said passageway for closing said passageway when said bracket shift is less than a predetermined value and for opening said passageway when said bracket shift is within a range which exceeds said predetermined value whereby said dash-pot device is relatively ineffective when said bracket shift is within said range.

5. In combination with means for mounting an engine on a supporting structure in which said mounting means comprises a bracket for attachment to an engine, a bracket for attachment to a supporting structure and resilient means operatively connecting said brackets whereby said brackets shift relative to each other in response to and to an extent dependent on engine torque output; a piston; a cylinder within which said piston is slidable, said piston and cylinder being operatively connected to said brackets for movement relative to each other in response to said bracket shift; a restricted flow passage connected between the ends of said cylinder whereby said piston and cylinder constitute a dash-pot device adapted to damp vibrations of said brackets relative to each other; means connected to said cylinder and providing a passageway connectible in relatively unrestricted communication with opposite sides of said piston; means connected to said piston and cooperable with said passageway for closing said passageway when said bracket shift is less than a predetermined value and for opening said passageway when said bracket shift is within a range which exceeds said predetermined value whereby said dash-pot device is relatively ineffective when said bracket shift is within said range; and pressure relief valve means for relieving excessive pressure at either end of the cylinder to the other end of said cylinder.

6. In combination with means for mounting an engine on a supporting structure in which said mounting means comprises a bracket for attachment to an engine, a bracket for attachment to a supporting structure and resilient means operatively connecting said brackets whereby said brackets shift relative to each other in response to and to an extent dependent on engine torque output; a piston; a cylinder within which said piston is slidable, said piston and cylinder being operatively connected to said brackets for movement relative to each other in response to said bracket shift; a restricted flow passage connected between the ends of said cylinder whereby said piston and cylinder constitute a dash-pot device adapted to damp vibrations of said brackets relative to each other; and a second passageway adapted to by-pass said restrictive flow passageway to provide relatively unrestricted communication between the ends of said cylinder on opposite sides of said piston when said bracket shift exceeds a predetermined value, said second passageway having one end opening into said cylinder at a point in which said end is closed by said piston when said bracket shift is relatively low and is uncovered by said piston when said bracket shift exceeds said predetermined value.

JOSEPH H. LEGGETT.
ROBERT M. MOYER.

References Cited in the file of this patent

UNITED STATES PATENTS

| Number | Name | Date |
| --- | --- | --- |
| 2,175,825 | Brown et al. | Oct. 10, 1939 |
| 2,175,999 | Taylor | Oct. 10, 1939 |
| 2,198,842 | Renaux et al. | Apr. 30, 1940 |
| 2,225,892 | Tyler | Dec. 24, 1940 |
| 2,238,179 | McIntosh | Apr. 15, 1941 |
| 2,351,427 | Henshaw | June 13, 1944 |
| 2,411,562 | Thompson | Nov. 26, 1946 |